(12) United States Patent
Siomina et al.

(10) Patent No.: US 10,341,893 B2
(45) Date of Patent: Jul. 2, 2019

(54) SYSTEM AND METHOD PROVIDING PARALLEL MULTICAST MEASUREMENTS

(71) Applicant: Telefonaktiebolaget LM Ericsson (publ), Stockholm (SE)

(72) Inventors: Iana Siomina, Täby (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 15/516,958

(22) PCT Filed: Oct. 8, 2015

(86) PCT No.: PCT/SE2015/051070
§ 371 (c)(1),
(2) Date: Apr. 5, 2017

(87) PCT Pub. No.: WO2016/056991
PCT Pub. Date: Apr. 14, 2016

(65) Prior Publication Data
US 2017/0303157 A1    Oct. 19, 2017

Related U.S. Application Data

(60) Provisional application No. 62/061,528, filed on Oct. 8, 2014.

(51) Int. Cl.
*H04W 24/10*    (2009.01)
*H04W 4/06*    (2009.01)
*H04L 12/18*    (2006.01)

(52) U.S. Cl.
CPC ............ *H04W 24/10* (2013.01); *H04W 4/06* (2013.01); *H04L 12/189* (2013.01)

(58) Field of Classification Search
CPC ........ H04W 24/10; H04W 4/06; H04L 12/189
See application file for complete search history.

(56) References Cited

U.S. PATENT DOCUMENTS

2010/0118713 A1* 5/2010 Breuer ............... H04W 48/12
370/252
2013/0065612 A1* 3/2013 Siomina ............. H04W 24/10
455/456.2

(Continued)

FOREIGN PATENT DOCUMENTS

WO    WO 2011 142715        11/2011
WO    WO-2013115694 A1 *    8/2013    ............ H04W 24/10

OTHER PUBLICATIONS

PCT International Search Report for International application No. PCT/SE2015/051070—dated Jan. 22, 2016.
(Continued)

*Primary Examiner* — Peter Chen
(74) *Attorney, Agent, or Firm* — Sage Patent Group

(57) ABSTRACT

In one example embodiment, a method (500) by a wireless device (110A-D) for performing parallel multicast measurements includes identifying, by the wireless device (110A-D), a parallel multicast measurement capability of the wireless device (110A-D). A configuration for performing parallel multicast measurements of a plurality of Multimedia Broadcast Multicast Service (MBMS) transmissions is received from a network node (115A-C). Based on the configuration received from the network node (115A-C), a procedure for performing the parallel multicast measurements of the plurality of MBMS transmissions may be adapted by the wireless device (110A-D). The plurality of parallel multicast measurements of the plurality of MBMS transmissions are then performed in accordance with the adapted procedure.

18 Claims, 10 Drawing Sheets

(56) References Cited

U.S. PATENT DOCUMENTS

2013/0201848 A1* 8/2013 Kazmi ................. H04W 24/00
                                                        370/252
2013/0286960 A1* 10/2013 Li ....................... H04W 72/042
                                                        370/329

OTHER PUBLICATIONS

3GPP TSG-RAN WG2#86; Seoul, Korea; Source: Qualcomm Incorporated; Title: Email discussion for Stage 3 CR of eMBMS measurements for Logged MDT (R2-142720)—May 19-23, 2014.
3GPP TSG-RAN WG4 Meeting #73; San Francisco, USA; Change Request; Title: CR on Parallel Reporting Criteria for eMBMS; Source to WG: Ericsson, Alcatel-Lucent; Source to TSG: R4 (R4-147874)—Nov. 17-21, 2014.
3GPP TSG-RAN WG2 #85bis; Valencia, Spain; Source: Ericsson; Title: eMBMS Measurements and Procedures in MDT (Tdoc R2-141489)—Mar. 31-Apr. 4, 2014.
PCT Written Opinion of the International Searching Authority for International application No. PCT/SE2015/051070—dated Jan. 22, 2016 .

* cited by examiner

US 10,341,893 B2

SYSTEM AND METHOD PROVIDING PARALLEL MULTICAST MEASUREMENTS

PRIORITY

This nonprovisional application is a U.S. National Stage Filing under 35 U.S.C. § 371 of International Patent Application Serial No. PCT/SE2015/051070 filed Oct. 8, 2015, and entitled "System And Method Providing Parallel Multicast Measurements" which claims priority to U.S. Provisional Patent Application No. 62/061,528 filed Oct. 8, 2014, both of which are hereby incorporated by reference in their entirety.

TECHNICAL FIELD

This disclosure pertains to a network system and method and more particularly to a system and method providing parallel multicast measurements.

BACKGROUND

Multimedia Broadcast Multicast Service (MBMS) is a broadcasting technique for E-UTRAN that optimizes downlink radio resource when a large number of users are interested in receiving the same content (e.g., video broadcast). MBMS generally covers a large geographic area that may comprise one or more cells. When the cells distribute the same services, MBMS single frequency network (MBSFN) transmission may increase the spectral efficiency of MBMS transmissions. In MBSFN transmission, identical data is transmitted on the same radio resources from each cell. Cells that offer the same set of MBMS services and the same scheduling of MBMS service sessions belong to one MBSFN area.

A wireless device, which may also be referred to as User Equipment (UE), uses an MBMS control channel (MCCH) to obtain service specific information used for MBMS service reception (e.g., physical multicast channel (PMCH) configuration such as modulation and coding scheme, MBMS subframe allocation, etc.).

MBMS may operate on an MBMS dedicated carrier frequency or on a shared carrier frequency (i.e. shared between MBMS and unicast). In the former case all subframes may be used for MBMS signal transmission. In the latter scenario, MBMS service and unicast service are shared, for example, in a time division multiplex manner (i.e., different subframes within a radio frame are used for MBMS and unicast services). The MBMS subframes may be configurable by the network node. The information regarding which subframes are configured for MBMS in a cell may be signaled by the network node. Examples of subframes that can be configured for MBMS (i.e., as MBSFN subframes) are subframes #1, 2, 3, 6, 7 and 8 for LTE FDD and subframes #3, 4, 7, 8 and 9 for LTE TDD. Subframes #0 and #5 are unicast subframes in both FDD and TDD. In LTE FDD, the subframes #4 and 9 and are also unicast subframes. In LTE TDD, subframes #1, 2 and 6 are also unicast subframes. The unicast subframes are used for unicast services.

An eNodeB (eNB) may be configured with MBMS scheduling information by a network entity referred to as a Multi-cell/Multicast Coordination Entity (MCE). An MCE may be a separate network node or may reside in an eNB. The MCE and eNB communicate over an M2 interface. The M2 interface is a logical interface between the eNB and the MCE.

An MBMS Scheduling Information Procedure provides MCCH related information to the eNBs that take part in the transmission. The procedure uses non MBMS-Service-associated signalling. Specifically, an MCE may initiate the procedure by sending a first message to the eNB that includes MBMS scheduling information. This first message provides MCCH related information to the eNB. For example, the first message may contain information such as MBSFN subframe configuration, common subframe allocation period, MBSFN Area ID, etc. The eNodeB uses this information for creating MBSFN subframe(s) and for creating the contents of the MCCH, which in turn is signalled to the UE over the radio interface. The successful reception of this message may be confirmed by the eNodeB in a response message.

For the scheduling of MBMS to the wireless device, MCCH information may be transmitted periodically and may be transmitted according to a configurable repetition period. Scheduling information may not be provided for MCCH (i.e., both the time domain scheduling as well as the lower layer configuration may be semi-statically configured, as defined within SystemInformationBlockType13 (SIB13)). For example, the SIB13 contains the information to acquire the MBMS control information associated with one or more MBSFN areas. The wireless device may also be provided with SystemInformationBlockType15 (SIB15). The SIB15 contains the MBMS Service Area Identities (SAI) of the current and/or neighbouring carrier frequencies.

For MBMS user data, which is carried by the MTCH logical channel, E-UTRAN periodically provides MCH scheduling information (MSI) at lower layers (e.g., MAC layer). This MCH information concerns the time domain scheduling (i.e., the frequency domain scheduling and the lower layer configuration are semi-statically configured). The periodicity of the MSI is configurable and defined by the MCH scheduling period.

MDT is a feature used for configuring a wireless device (i.e., UE) to log one or more radio measurement results along with associated information. Such information may comprise location information such as a location where the measurement is performed, timing information such as a timestamp when the measurement is performed, or any other information associated with a radio measurement. The wireless device may be configured to log such measurements during a low activity state (e.g., idle state) and/or in RRC Connected state. The wireless device may then report the logged information to the network node when the wireless device goes into the RRC Connected state. The network node uses the MDT related information received from wireless devices for network deployment related functions (e.g., determination of coverage holes, network planning, configuration of system parameters, etc.). The MDT reduces the need for doing drive tests for network planning and optimization.

A network node (e.g. eNodeB) may configure a wireless devices to log measurements performed on MBMS-related signals such as, for example, MBSFN RSRP (on MBSFN reference signals), MBSFN RSRQ (on MBSFN reference signals), and MCH BLER (on MCH). These measurements are configured and performed in MBSFN subframes that transmit MCH. The measurements may be configured per MBSFN area (up to 8 MBSFN areas) and per MCH (up to 15 MCHs within an MBSFN area). The requested measurements may be limited to one or more PLMNs, one or more cells, one or more tracking areas, and/or one or more specific carrier frequencies. The measurements in the measurement logs may be linked to a time stamp and/or positioning information that are available in the wireless device. The time stamp may be expressed in absolute or relative values. The relative time stamp may be defined as the time elapsed from a reference time to the moment the measurement is logged by a radio node. The relative accuracy of the time stamping (i.e., relative time stamp accuracy) is the drift of the time stamping (e.g., ±1 second). It may also be expressed in terms of parts per million (ppm) or parts per billion (ppb) over a certain time duration (e.g., ±200 ppb over 1 hour). This example corresponds to ±0.72 seconds of drift in a time stamp over a period of 1 hour.

Wireless devices may receive logging configuration parameters from an eNB or other network node in a Logged-MeasurementConfiguration messages. Example parameters may include trace reference, trace session and TCE (Trace Collection Entity) information; logging interval; logging duration; time information (absolute time in the current cell); PLMN list; area list; and/or target MBSFN area list.

FIG. 1 is a swim-lane diagram illustrating the interaction of a wireless device 110 and network node 110 for the configuration and performance of parallel multicast measurements. As depicted, minimizing drive test (MDT) information is provided from network node 115 to wireless device 110 in a first transmission 402. In certain embodiments, the MDT information may include configuration and scheduling information to be used by wireless devices 110 for the performance of parallel multicast measurements of MBMS transmissions. More specifically, in a particular embodiment, the first transmission 102 includes a MBMS control channel (MCCH) that is signaled to wireless device 110.

After wireless device 110 goes into an idle state 104, wireless device 110 may perform MDT measurements in accordance with the MDT information received in first transmission 102. In certain embodiments, the measurements may be performed in response to detection of an event that triggers the performance and logging of multicast measurements.

The performance of the parallel measurements may result in the generation of one or more MDT measurement log entries 106. The measurements may be logged and stored until wireless device 110 transitions into a radio resource control (RRC) connected state 108.

Upon transition to the RRC connected state 108, wireless device 110 may send a second transmission 110 to network node 115. The second transmission 110 may include radio resource control connection (RRCC) setup complete message and may include information identifying that MDT log information is available from wireless device 110.

In certain embodiments, network node 115 may respond to the second transmission 110 with a third transmission 112 that requests the MDT log information from wireless device 110. In response to third transmission 112, wireless device 110 may send MDT log information 114 to network node 115. Network node 115 may then save the MDT log information as trace records at state 116 and transmit the trace records to a trace collection entity in a fourth transmission 118.

The current version of 3GPP TS 36.133 specifies requirements for wireless device capabilities regarding event triggering and reporting criteria. The current requirements include mobility measurements and include a set of reporting criteria categories, a number of reporting criteria per category that a UE shall be able to support in parallel, and a maximum total number of reporting criteria. The current set of reporting criteria comprise three measurement categories used for mobility or positioning: intra-frequency, inter-frequency and inter-RAT measurements. As long as the measurement configuration does not exceed these requirements (e.g., different network nodes do not request from a wireless device more measurements than specified by the minimum requirement), the wireless device shall meet the performance requirements defined by the standard (e.g., all measurement accuracy and measurement time requirements that are relevant).

According to 3GPP TS 36.133, a reporting criterion corresponds to either one event (in the case of event based reporting), or one periodic reporting criterion (in case of periodic reporting), or one no-reporting criterion (in case of no-reporting, but when the wireless device is still expected to perform measurements).

A wireless device may be requested to make measurements under different measurement identities defined in 3GPP TS 36.331. Each measurement identity corresponds to either event based reporting, periodic reporting, or no reporting. For event based reporting, each instance of event, with the same or different event identities, is counted as a separate reporting criterion in the requirements for reporting criteria. For periodic reporting, a measurement identity is associated with one periodic reporting criterion. For no-reporting, a measurement identity is associated with one no-reporting criterion.

According to the current standards, a wireless device is able to support in parallel per category up to $E_{cat}$ reporting criteria according to these requirements. For the measurement categories belonging to measurements on (a) E-UTRA intra-frequency cells, (b) E-UTRA inter-frequency cells, and (c) inter-RAT per supported RAT, the wireless device need not support more than the following total number of reporting criteria:

26 reporting criteria in total if the wireless device is not configured with any SCell carrier frequency,
  35 reporting criteria in total if the wireless device is configured with one SCell carrier frequency and
  44 reporting criteria in total if the wireless device is configured with two SCell carrier frequencies.

Traditional measurement methods may include one or more disadvantages. For example, MDT logs may grow large in size. As one specific example, eMBMS measurements for 8 MBSFN areas and 15 MCHs per MBSFN area may result in up to 120 measurement sets, each set comprising corresponding MBSFN RSRP, MBSFN RSRQ, and MCH BLER measurements). This number of measurements may consume a large amount of wireless device resources. In addition, the wireless device may be performing other measurements, for MDT or other purposes (e.g., RRM, mobility, positioning, etc.). Particular advantages may be realized if total wireless device capacity can be efficiently shared among all the measurement procedures.

Another disadvantage may result when multiple network nodes configure a wireless device to perform different measurements for different purposes. If the network nodes are not aware of the wireless device's measurement capacity and the wireless device's currently configured measurements, the total amount of measurements requested from the wireless device at the same time may exceed the wireless device's measurement capacity.

Still another disadvantage may occur when measurements performed on broadcast signals, such as eMBMS measurements (MBSFN RSRP/MBSFN RSRQ/MCH BLER) may need to be performed in subframes with broadcast channels (e.g., MCH) scheduled. The MCH scheduling information determines, for example, the time needed to complete a measurement, the number of measurements that can be performed in the same subframes, and the frequency of the measurement samples.

The problems described above regarding a wireless device measurement capacity may also apply to the wireless device's measurement reporting capacity. Additionally, no wireless device measurements or reporting capabilities are currently defined that account for multicast or broadcast measurements. Furthermore, the same MDT logging configuration that is used to configure a wireless device for different measurements logging. Logging for legacy eMBMS, MDT, and MBSFN MDT measurements may not be configured simultaneously.

SUMMARY

In a particular example implementation, a method performed by a wireless device for performing parallel multicast measurements includes identifying a parallel multicast measurement capability of the wireless device. A configuration for performing parallel multicast measurements of a plurality of Multimedia Broadcast Multicast Service (MBMS) transmissions is received from a network node. Based on the configuration received from the network node, a procedure for performing the parallel multicast measurements of the plurality of MBMS transmissions is adapted and the parallel multicast measurements of the plurality of MBMS transmissions is performed in accordance with the adapted procedure.

In another particular example implementation, a method performed by a wireless device for performing parallel multicast measurements includes identifying a parallel multicast measurement capability of the wireless device. The parallel multicast measurement capability may include a threshold value identifying a maximum number of parallel multicast measurements that may be performed in parallel by the wireless device. The wireless device may determine that the wireless device is configured to perform more parallel multicast measurements than the threshold value and transmit a message indicative of a need for a configuration to a network node. The wireless device may receive, from the network node, the configuration for performing parallel multicast measurements of a plurality of Multimedia Broadcast Multicast Service (MBMS) transmissions. Based on the configuration received from the network node, a procedure for performing the parallel multicast measurements of the plurality of MBMS transmissions may be adapted. The adapted procedure may reduce a number of parallel multicast measurements performed or reduces a number of measurement results logged. The parallel multicast measurements of the plurality of MBMS transmissions may be performed in accordance with the adapted procedure.

In another particular example implementation, a method performed by a network node for configuring a first wireless device to perform parallel multicast measurements includes identifying, based on a parallel multicast measurement capability of a first wireless device, a configuration to be applied to the first wireless device. The configuration for performing by a parallel multicast measurements associated with one of a plurality of Multimedia Broadcast Multicast Service (MBMS) transmissions may be transmitted to the first wireless device. The configuration may adap a previous configuration maintained by the first wireless device.

Certain embodiments may have one or more technical advantages. For example, certain embodiments reconfigure a wireless device to reduce the number of measurements to be logged during the performance of parallel multicast measurements. Specifically, a wireless device may be reconfigured to select, prioritize, delay, or drop some of the configured measurements to be performed. As a result, a wireless device may be configured to log more critical measurements when the number of measurements to be performed exceed a threshold level.

As another advantage, certain embodiments reconfigure a wireless device to reduce wireless device complexity and power consumption. For example, certain embodiments may reconfigure a wireless device by changing, controlling or altering the sampling rate, a measurement time, sampling periodicity, or receiver parameter. Configuration changes that reduce the number of measurements taken and/or the measurements logged may reduce power consumption. As another example, certain embodiments may change the activity level of a wireless device during the performance of parallel multicast measurements by decreasing the DRX cycle.

As another advantage, certain embodiments reconfigure a wireless device to more efficiently reuse spare resources (e.g., memory, processors, etc.) for logging measurements. For example, certain embodiments may reduce the number of measurements performed and, thus, reduce the processing power required to perform those measurements. Likewise, where fewer measurements are performed, less processing power is required to log the measurements and/or report the measurements. Additionally, less memory is required for storing logged measurements.

As still another advantage, certain embodiments inform other nodes of a particular wireless device's capabilities. For example, certain embodiments result in a first network node transmitting configuration information of a wireless device to a second network node. As a result, both network nodes may adjust the number and or frequency of measurements requested from the wireless device.

Some embodiments may benefit from some, none, or all of these advantages. Other technical advantages may be readily ascertained by one of ordinary skills in the art.

DETAILED DESCRIPTION

Particular embodiments are described in FIGS. 1-10 of the drawings, like numerals being used for like and corresponding parts of the various drawings.

Figure 1:
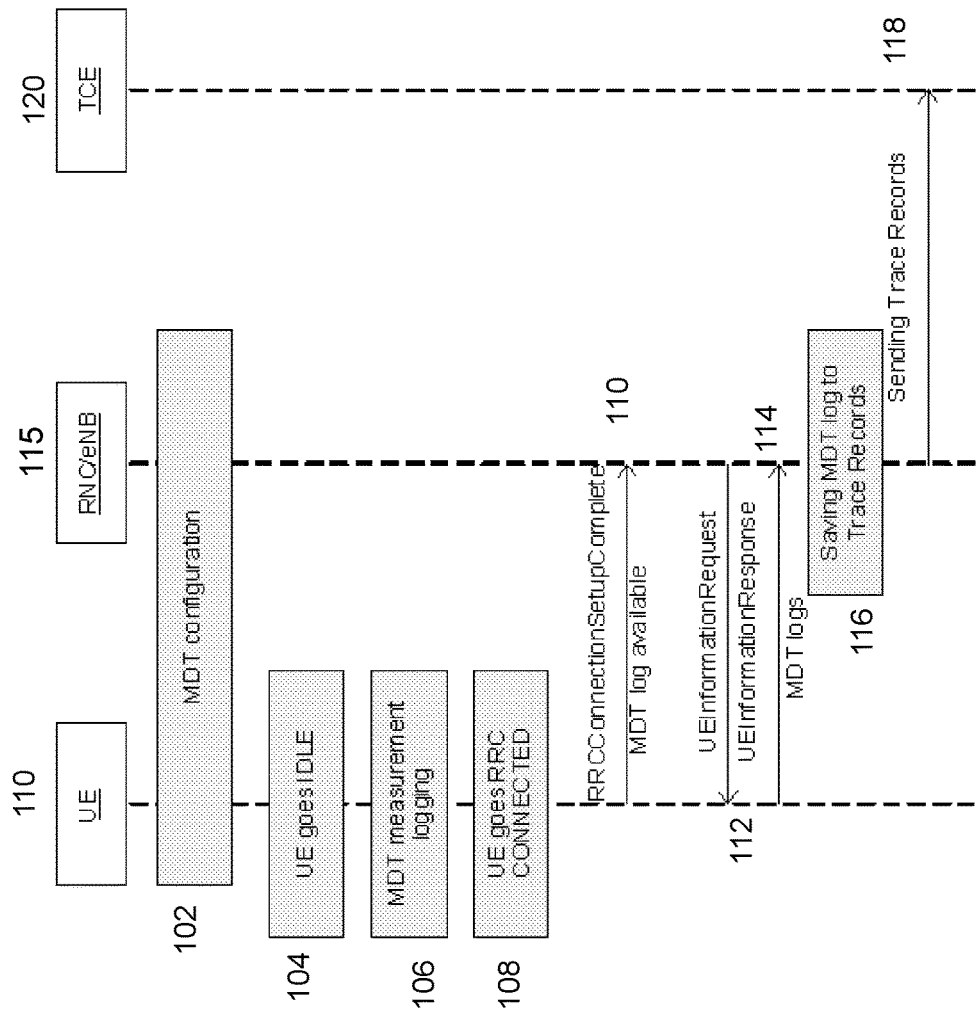
FIG. 1 is a swim-lane diagram illustrating previous techniques providing for the configuration and performance of parallel multicast measurements, according to a particular embodiment.
Figure 2:
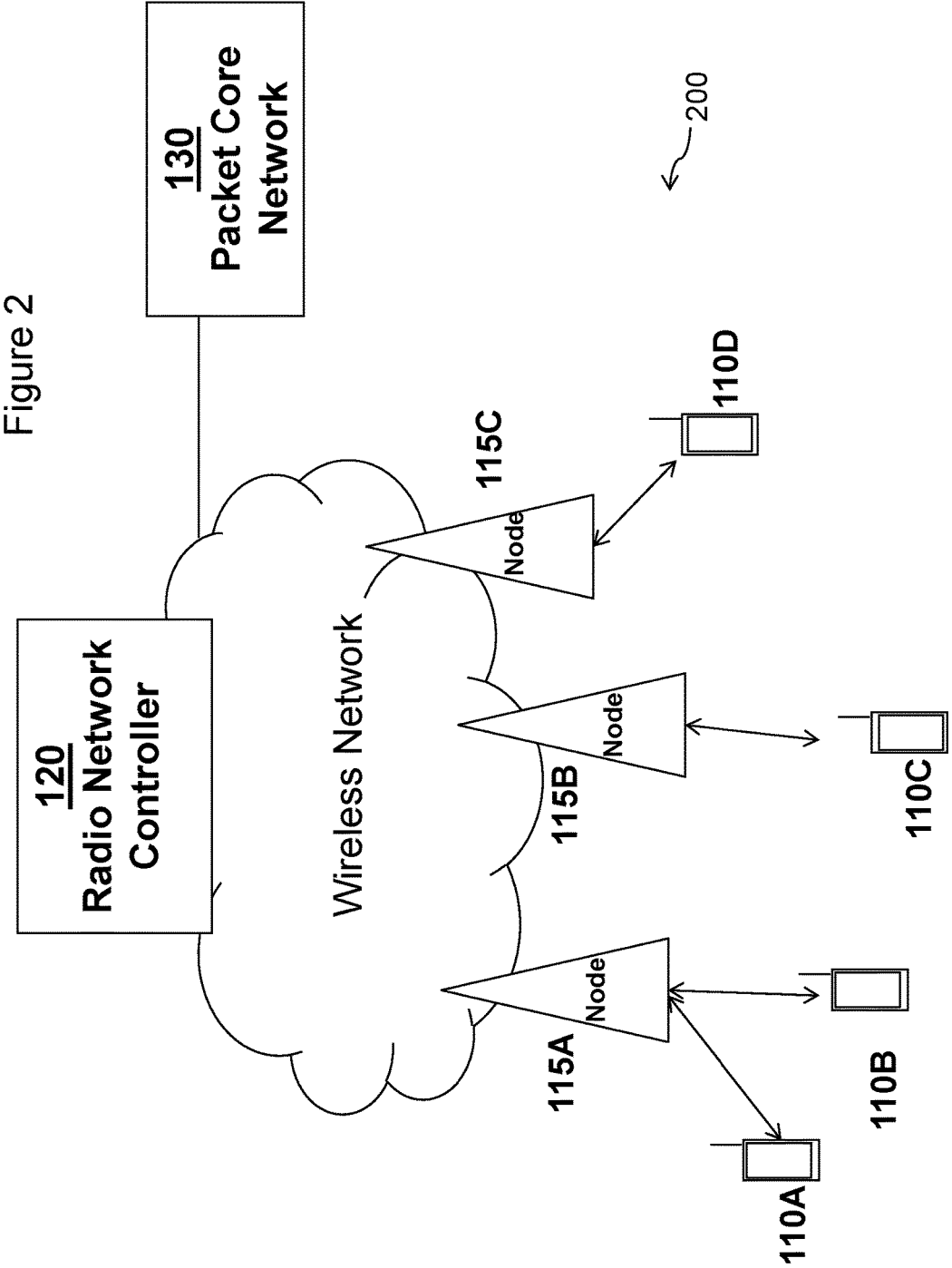
FIG. 2 is a block diagram illustrating an exemplary network, according to a particular embodiment.

Certain network devices within a wireless network may cooperate to provide parallel multicast measurements of Multimedia Broadcast Multicast Service (MBMS) transmissions. FIG. 2 is a block diagram illustrating an exemplary wireless network 200 that includes one or more wireless devices 110A-D, network nodes 115A-C, radio network controller 120, and packet core network node 130. Wireless devices 110A-D may communicate with network nodes 115A-C over a wireless interface. For example, wireless devices 110A and 110B may transmit wireless signals to network node 115A and/or receive wireless signals from network node 115A. The wireless signals may contain voice traffic, data traffic, control signals, and/or any other suitable information and may be transmitted via cellular links 140A-140B. Likewise, wireless devices 110C and 110D may transmit wireless signals to and receive wireless signals from network nodes 115B and 115C via cellular links 140C and 140D, respectively.

Radio network nodes 115A-C may interface with radio network controller 120. The radio network nodes 115A-C and the radio network controller 120 are comprised in a radio access network, RAN. Radio network controller 120 may control radio network node 115A-C and may provide certain radio resource management functions, mobility management functions, and/or other suitable functions. Radio network controller 120 may interface with packet core network node 130. In certain embodiments, radio network controller 120 may interface with packet core network node 130 via an interconnecting network. The interconnecting network may refer to any interconnecting system capable of transmitting audio, video, signals, data, messages, or any combination of the preceding. The interconnecting network may include all or a portion of a public switched telephone network, PSTN; a public or private data network; a local area network, LAN; a metropolitan area network, MAN; a wide area network, WAN; a local, regional, or global communication or computer network such as the Internet; a wireline or wireless network; an enterprise intranet; or any other suitable communication link, including combinations thereof.

In some radio access technologies, RATs, such as in LTE networks, the functions of the radio network controller 120 are comprised in the radio network nodes 115A-C. In some embodiments, packet core network node 130 may manage the establishment of communication sessions and various other functionality for wireless devices 110A-D. For example, wireless devices 110A-D, radio network nodes 115A-C, and packet core network node 130 may use any suitable radio access technology, such as long term evolution, LTE; LTE-Advanced; Universal Mode Telecommunications System, UMTS; High Speed Packet Access, HSPA; Global System for Mobile Communications, GSM; code division multiple access 2000, CDMA2000; Worldwide Interoperability for Microwave Access, WiMax; WiFi; another suitable radio access technology; or any suitable combination of one or more of these or other radio access technologies. In particular embodiments, a wireless device 110A-D may exchange certain signals with packet core network node 130 using the non-access stratum layer. In non-access stratum signaling, signals between wireless device 110A-D and packet core network node 130 may be transparently passed through the radio access network.

As described herein, embodiments of network 100 may include one or more wireless devices 110A-D and one or more different types of network nodes capable of communicating (directly or indirectly) with wireless devices 110A-D. Examples of the network nodes include network nodes 115A-C, radio network controller 120, and packet core network node 130. However, network 100 may include any additional elements suitable to support communication between wireless devices 110A-D or between a wireless device 110A-D and another communication device (such as a landline telephone). Each wireless device 110A-D, radio network node 115A-C, radio network controller 120, and packet core network node 130 may include any suitable combination of hardware and/or software. Examples of particular embodiments of wireless devices 110A-D, radio network nodes 115A-B, and network nodes (such as radio network controller 120 and packet core network 130) are described with respect to FIGS. 3, 4, and 10, respectively.

Certain embodiments described herein may be combined with each other. For example, some particular embodiments may be applicable to single carrier as well as to multicarrier or carrier aggregation (CA) operation of the wireless device 110A-D in which the wireless device 110A-D is able to receive and/or transmit data to more than one serving cells. Carrier aggregation (CA) may also be referred to as "multicarrier system", "multi-cell operation", "multi-carrier operation", and/or "multi-carrier transmission and/or reception". In CA one of the component carriers (CCs) is the primary component carrier (PCC) or simply primary carrier or even anchor carrier. The remaining carriers are referred to as secondary component carrier (SCC) or simply secondary carriers or even supplementary carriers. A serving cell may be referred to as a primary cell (PCell) or a primary serving cell (PSC). A secondary serving cell may be referred to as a secondary cell (SCell) or a secondary serving cell (SSC).

Figure 3:
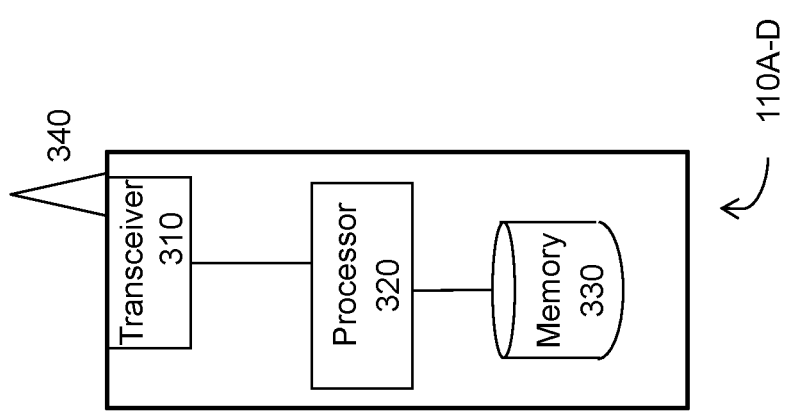
FIG. 3 is a block diagram illustrating an exemplary wireless device, according to a particular embodiment.

FIG. 3 is a block diagram illustrating an example embodiment of a wireless device 110A-D. In the depicted embodiment, wireless device 110A-D includes transceiver 310, processor 320, and memory 330. In some embodiments, transceiver 310 facilitates transmitting signals to and receiving signals from network devices such as network nodes 115A-C. Transceiver 310 may include, although not shown, a transmitter and a receiver. Thus, in some instances, transceiver circuit includes a transceiver to perform functions of both a transmitter and a receiver. For example, a transmitter may convert baseband signals from processor 320 to RF signals, and a receiver may convert RF signals to baseband signals. Transceiver 310 connects to antenna 240 for transmission and/or reception of the RF signals.

Processor 320 executes instructions to provide some or all of the functionality described herein as being provided by wireless devices 110A-D, and memory 330 stores the instructions executed by processor 320.

Antenna 340 includes one or more antennas to transmit and/or receive radio frequency (RF) signals over the air interface. Antenna 340 may, for example, receive RF signals from transceiver 310 and transmit the RF signals over the air interface to network nodes, such as network nodes 115A-C. Additionally, antenna 340 may receive RF signals over the air interface from network nodes 115A-C and provide the RF signals to transceiver 310.

Processor 320 may include any suitable combination of hardware and software implemented in one or more modules to execute instructions and manipulate data to perform some or all of the described functions of wireless devices 110A-D. In some embodiments, processor 320 may include, for example, one or more computers, one or more central processing units (CPUs), one or more microprocessors, one or more applications, one or more application specific integrated circuits (ASICs), one or more field programmable gate arrays (FPGAs), and/or other logic. Processor 320 may control the operations of wireless device 110A-D and its components.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 320.

Other embodiments of wireless device 110A-D may include additional components beyond those shown in FIG. 2 that may be responsible for providing certain aspects of the wireless device's functionality, including any of the functionality described above and/or any additional functionality (including any functionality necessary to support parallel multicast measurements, which is described in more detail below). As just one example, wireless device 110A-D may include input devices and circuits, output devices, and one or more synchronization units or circuits, which may be part of the processor 320. Input devices include mechanisms for entry of data into wireless device 110A-D. For example, input devices may include input mechanisms, such as a microphone, input elements, a display, etc. Output devices may include mechanisms for outputting data in audio, video and/or hard copy format. For example, output devices may include a speaker, a display, etc.

Some embodiments may described using the non-limiting term "UE." The term UE may refer to any type of wireless device capable of communicating with a network node or another UE using radio signals and, thus, may be used interchangeably with the term "wireless device." It may be generally recognized that a UE or wireless device may refer to a radio communication device, target device, device to device (D2D) UE, machine type UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE), etc. The terms UE and wireless device may include, but should not be limited to, a mobile station, a fixed or mobile subscriber unit, a pager, a cellular telephone, a personal digital assistant (PDA), a computer, or any other type of user device capable of operating in a wireless communication.

Figure 4:
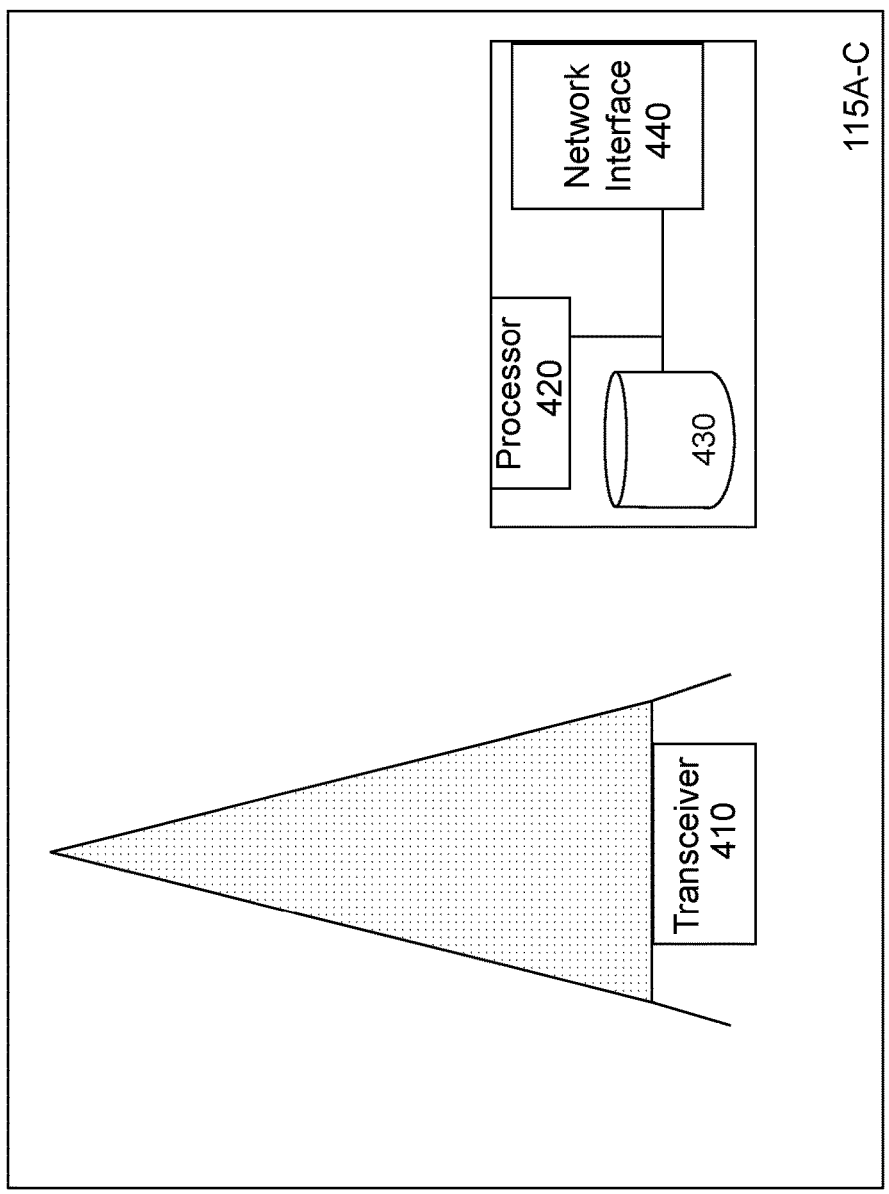
FIG. 4 is a block diagram illustrating an exemplary network node, according to a particular embodiment.

FIG. 4 is a block diagram illustrating embodiments of network node 115A-C. In certain embodiments, network node 115A-C includes a radio access node, such as an eNodeB, a node B, a base station, a multicast controlling node, a MBSFN node, a positioning node, a wireless access point (e.g., a Wi-Fi access point), a low power node, a base transceiver station (BTS), transmission points, transmission nodes, remote RF unit (RRU), remote radio head (RRH), a relay node, a UE acting as a relay node, or another suitable radio access node.

Network nodes 115A-C are deployed throughout network 200 as a homogenous deployment, heterogeneous deployment, or mixed deployment. A homogeneous deployment generally describes a deployment made up of the same (or similar) type of radio access nodes and/or similar coverage and cell sizes and inter-site distances. A heterogeneous deployment generally describes deployments using a variety of types of radio access nodes having different cell sizes, transmit powers, capacities, and inter-site distances. For example, a heterogeneous deployment may include a plurality of low-power nodes placed throughout a macro-cell layout. Mixed deployments include a mix of homogenous portions and heterogeneous portions.

As depicted, network nodes 115A-C includes one or more of transceiver 410, processor 420, memory 430, and network interface 440. Transceiver 410 facilitates transmitting wireless signals to and receiving wireless signals from wireless communication device 110A-D (e.g., via an antenna), processor 320 executes instructions to provide some or all of the functionality described above as being provided by a network node 115A-C, memory 430 stores the instructions executed by processor 420, and network interface 440 communicates signals to backend network components, such as a gateway, switch, router, Internet, Public Switched Telephone Network (PSTN), other network nodes, core network nodes 130, etc.

Processor 420 includes any suitable combination of hardware and software implemented in one or more modules to execute instructions and manipulate data to perform some or all of the described functions of network node 115A-C. In some embodiments, processor 420 includes, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processor 420 and refers to any suitable device operable to receive input for radio network node 115A-C, send output from radio network node 115A-C, perform suitable processing of the input or output or both, communicate to other devices, or any combination of the preceding. Network interface 440 includes appropriate hardware (e.g., port, modem, network interface card, etc.) and software, including protocol conversion and data processing capabilities, to communicate through a network.

Other embodiments of network node 115A-C include additional components (beyond those shown in FIG. 4) responsible for providing certain aspects of the radio network node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Some embodiments are described with the non-limiting terms "radio network node" or "network node (NW node)". These may refer to any kind of network node that may include a base station, multicast controlling node, MBSFN node, positioning node, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., TCE, MME, MDT node, MBMS node), or even an external node (e.g., 3rd party node, a node external to the current network), etc. The term "radio node" may refer to a UE or a radio network node.

In various embodiments, network nodes 115A-B may cooperate to provide configurations to wireless devices 110A-D for the performance of these parallel multicast measurements. Thus, in various embodiments, wireless devices 110A-D may include one or more parallel measurement capabilities for performing measurements on MBMS transmissions. A parallel measurement capability may refer to the ability of wireless device 110A-D to perform measurements in parallel, to track measurements in parallel, to log measurements in parallel, to report measurements in parallel, or any combination of the preceding wherein the measurements are two or more of unicast, multicast, and/or broadcast measurements or their combination. In a particular embodiment, parallel measurement capability may refer to one or more parallel measurement capabilities accounting for at least one multicast measurement. In particular embodiments, "multicast measurements" may refer to any measurement performed on multicast, groupcast, or broadcast (a special case of multicast) signals or channels. Examples of multicast measurements include MBMS single frequency network reference signal received power (MBSFN RSRP), MBMS single frequency network reference signal received quality (MBSFN RSRQ), and multicast channel MCH block error rate (MCH BLER). In particular embodiments, wireless device 110A-D may maintain its parallel multicast measurement capabilities and may perform according to those multicast measurement capabilities. Maintaining parallel multicast measurement capabilities refers to one or more of configuring, storing, updating, extracting, determining, obtaining, etc. a wireless device's parallel multicast measurement capabilities.

In particular embodiments, a relative measurement may be counted as two measurements. In particular embodiments, a multicast measurement with an associated channel may be considered as a complex measurement comprising the measurement itself and receiving (receiving, decoding, etc.) the associated channel. In particular embodiments, a complex measurement may be counted as two measurements, which may be of the same (e.g., both are intra-frequency measurements for MDT) or different types (e.g., one is a measurement without decoding and the other one is the associated channel reception with decoding).

As described above, 3GPP standards provide requirements and/or limitations relating to wireless device capabilities for event triggering of the performance of parallel multicast measurements and the reporting thereof. For example, 3GPP standards specify a set of reporting criteria categories, a number of reporting criteria per category that a wireless device 110A-C shall be able to support in parallel, and a maximum total number of reporting criteria. The performance and/or reporting of measurements in excess of the requirements and/or limitations may result in degraded performance of wireless devices 110A-D or other network components. However, there are currently no requirements or limitations defined for multicast and/or broadcast measurements. Additionally, network nodes 115A-C may not be aware that a wireless device 110A-D is receiving parallel multicast measurement configurations and logging requests from multiple network nodes 115A-C. If each request is fulfilled by wireless device 110A-D, the performance of wireless device may be degraded.

Figure 5:
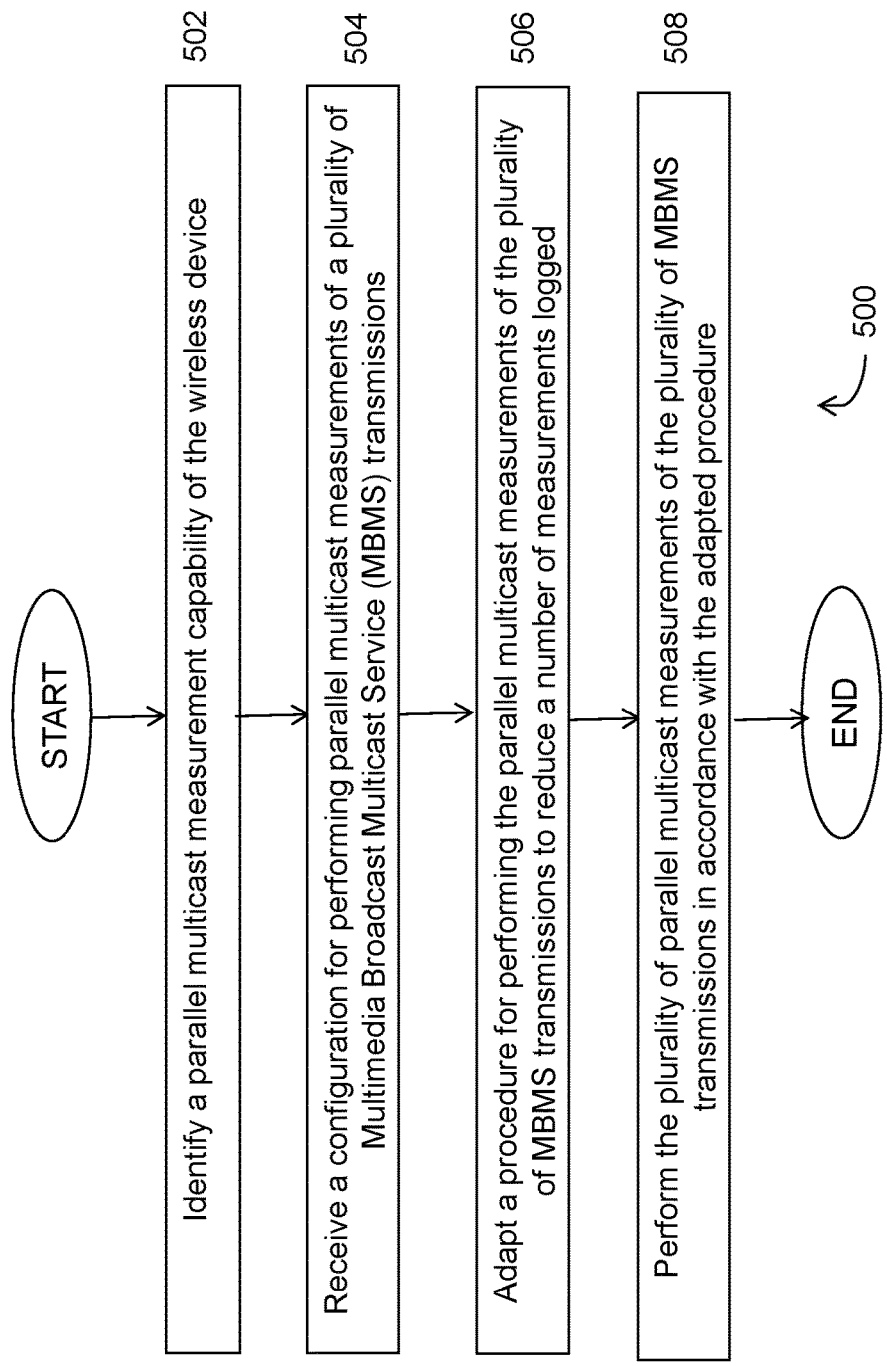
FIG. 5 is as flow chart illustrating an exemplary method for adapting a procedure of a wireless device for performing parallel multicast measurements of MBMS transmissions, according to a particular embodiment.

Accordingly, in a particular embodiment, a wireless device 110A-D may operate to recognize or identify a parallel multicast measurement capability of the wireless device 110A-D and request reconfiguration for the adaptation of the procedures performed by the wireless device 110A-D during parallel multicast measurements. FIG. 5 is as flow chart illustrating an exemplary method 500 for adapting a procedure of a wireless device for performing parallel multicast measurements of MBMS transmissions.

As illustrated the method begins at step 502 with the identification by wireless device 110A-D of a parallel multicast measurement capability. In various embodiments, the identification of the parallel multicast measurement capability may include identifying one of the following parallel multicast measurement capabilities:

a maximum number of measurements that can be performed by a wireless device 110A-D in parallel, tracked by wireless device 110A-D in parallel, logged by the wireless device 110A-D in parallel, and/or reported by the wireless device 110A-D in parallel, wherein the measurements comprise at least one multicast measurement;

a maximum number of multicast measurements that can be performed by the wireless device 110A-D in parallel, tracked by the wireless device 110A-D in parallel, logged by the wireless device 110A-D in parallel, and/or reported by the wireless device 110A-D in parallel;

a maximum number of multicast measurements with associated channel (e.g., maximum number of one or more of MBSFN RSRP/MBSFN RSRQ/MCH BLER associated with an MCH) that can be performed by the wireless device 110A-D in parallel, tracked by the wireless device 110A-D in parallel, logged by the wireless device 110A-D in parallel, and/or reported by the wireless device 110A-D in parallel;

at least one reporting criteria for the measurements for the wireless device 110A-D, wherein at least one reporting criteria is related to at least one multicast measurement; and at least one reporting criteria for the parallel multicast measurements performed by the wireless device 110A-D.

In certain embodiments, parallel multicast measurement capabilities may be further defined for:

one or more of intra-frequency, inter-frequency, inter-band, inter-RAT and CA measurements;

generic purpose or for one or more specific purpose (e.g., MDT, positioning, mobility, RRM);

one, some, or all services;

one, some, or all multicast services;

one or more cells (e.g., identified by an ID);

cells of one, some, or all types (e.g., serving cell, PCell, SCell, non-serving cell);

cells of one, some, or all configurations (e.g., activated or deactivated SCells);

one or more networks (e.g., PLMNs);

one or more geographical or logical areas (e.g., tracking area, MBSFN area, etc.);
one, some, or any channel associated with resources in which the measurements are to be performed (e.g., for eMBMS measurements that are performed in MBSFN subframes with MCH transmitted, there may be different MCHs within one MBSFN area, and the wireless device 110A-D may be requested to log measurements performed in subframes associated with any or a specific MCH);
one, some, or all of a wireless device's connectivity states (e.g., RRC IDLE, RRC CONNECTED, out-of-coverage states, and/or partial network coverage states);
one, some, or all of a wireless device's activity states (e.g., DRX and/or non-DRX);
one, some, or all measurement types (e.g., absolute or relative measurements; timing measurements, power-based measurements such as received signal strength or signal quality; sensor measurements; radio measurements or environment measurements such as barometric pressure, humidity, temperature; etc.);
wireless device with one or more specific capabilities (e.g., CA-capable wireless devices, MDT capable wireless devices, wireless devices with a specific RF capability, wireless devices with a specific processing capability, wireless devices with a specific transmission capability such as high-power wireless devices, specific wireless device's receiver architecture, wireless device's memory size);
wireless device with one or more specific configurations (e.g., CA configuration, RF configuration, etc.); and
one or more specific radio conditions (e.g., the measured signal strength is above a threshold, the interference is below a threshold, the measured signal quality is above a threshold, the channel associated with the measurement can be decoded by the wireless device [e.g., MCH can be decoded], the log size does not exceed a threshold, the measurement or the measured signal periodicity does not exceed a first threshold and/or is not below a second threshold).

In particular embodiments, parallel multicast measurement capabilities may be pre-defined in the wireless device 110A-D. Thus, the parallel multicast measurement capability may be identified from one or more predefined configurations stored in a memory of wireless device 110A-D.

At step 504, a configuration for performing parallel multicast measurements of MBMS transmissions is received from network node 115A-C. The configuration may comprise a new configuration or reconfiguration of a previously defined configuration. For example, in one particular exemplary embodiment, wireless device 110A-D may request reconfiguration information from network node 115A-C.

At step 506, wireless device 110A-C adapts a procedure for performing the parallel multicast measurements of the MBMS transmissions. In particular embodiments, a wireless device 110A-C may adapt one or more measurement procedures based on its parallel multicast measurement capabilities. Measurement procedures may include multicast measurement procedures and/or non-multicast (e.g., unicast) measurement procedures. Adaptation of these procedures may be performed jointly or in a coordinated way with a network node 115A-C such as when wireless device requests reconfiguration information and receives the configuration at step 504 in response to such a request.

In particular embodiments, for example, adaptation of one or more measurement procedures may include:
configuring or reconfiguring one or more measurements,
controlling the start, stop, delaying, or resuming of a measurement procedure,
controlling the time instances when the measurement sampling is performed,
controlling the sampling rate,
controlling how the measurement samples are combined,
controlling the measurement time,
controlling the measurement accuracy,
controlling the measurement or measurement sampling periodicity,
controlling or changing at least one receiver parameter,
controlling measurement logging procedure (e.g., start, stop, restart, etc.),
controlling measurement logging configuration (e.g., logging duration, periodicity, amount of logging, time or a trigger or a condition to start/stop/restart/delay/resume the logging),
controlling measurement reporting procedure (e.g., start, stop, restart, etc.),
controlling measurement reporting configuration (e.g., amount of reporting, periodicity, triggering time/event/condition to start/stop/restart/delay/resume the reporting, reporting duration, etc.),
changing or recommending to change the activity level (e.g., currently used DRX cycle to a different DRX cycle such as from DRX cycle=640 ms to 40 ms),
selecting or changing currently configured DRX cycle out of two or more DRX cycles which are pre-configured by the network node or pre-defined,
adapting the number of measurements to perform, to log, and/or to report, the measurements comprising at least one multicast measurement, and
adapting the number of non-multicast measurements to perform, to log, and/or to report in parallel to at least one multicast measurement/

In a particular embodiment, for example, adapting the procedure may include adapting the number of measurements to log depending on its carrier aggregation (CA) capability and/or currently used CA configuration (in terms of configured component carriers (CCs) and/or activated SCells). For example: a wireless device 110A-C may not reduce the number of measurements to log by certain margin if the wireless device 110A-D is CA capable but is not configured with at least (L−K+n) CCs, where L is total number of supported CCs, K is the number of CCs currently configured for CA operation and n is a parameter (e.g. n=1 or 2) which can be pre-defined or indicated by the wireless device 110A-D. Alternatively, the wireless device 110A-D may not reduce or reduce the number of measurements configured for logging by certain margin if the wireless device is CA capable but is configured with only PCell (i.e., single carrier operation).

In other embodiments, wireless device 110A-D may adapt the number of measurements to log depending on its D2D operation capability and/or currently used D2D configuration (in terms of number of D2D signals and/channels wireless device 110A-D transmit and/or receive). For example, wireless device 110A-D may not reduce at all or reduce the number of measurements configured for logging by certain margin if wireless device 110A-D is D2D capable but is configured with only cellular (i.e., WAN operation) operation.

In still other embodiments, wireless device 110A-D may controlling the logging of one or more measurements with one or more reduced set of auxiliary information when a total number of measurements and/or type of measurements to log is above a threshold. For example, wireless device 110A-D may log all measurements or certain measurements without positioning or location information. As another example, wireless device 110A-D may log information with coarse absolute or relative time stamp accuracy when number of measurements to log is above a threshold. In contrast, wireless device 110A-D may log with fine time stamp accuracy when number of measurements to log is below a threshold. Examples of coarse and fine relative time accuracies may include ±1.72 second and ±0.72 second respectively of drift in time stamp over a period of 1 hour, in a particular embodiment. When logging with coarse absolute or relative time stamp accuracy, wireless device 110A-C may use a coarse clock (less accurate) that involves less processing. In contrast, when logging with fine absolute or relative time stamp accuracy, wireless device 110A-C may use a more accurate clock that involves more processing and memory resources.

In still other embodiments, wireless device 110A-D may reconfigure or redistribute or reschedule the logging of measurements in different activity states. This may be triggered based on one or more conditions (e.g., if total number of measurements and/or types of measurements to log in parallel exceed a threshold). For example, according to a particular embodiment, wireless device 110A-C may be configured to log eMBMS measurements in connected state and non-eMBMS measurements in an idle state. The reverse may also be true. As another example, wireless device 110A-C may be configured to log measurements on carriers of a serving RAT in a connected state and measurements on carriers of a non-serving RAT in an idle state. As still another example, wireless device 110A-C may adapt or reschedule the logging of measurements based on one or more of a wireless device autonomous decision, a pre-defined rule, and/or an indication received from a network node 115A-C.

In any of these or other embodiments, the adaptation of the procedure performed in step 506 may be pre-defined (e.g., as a pre-defined wireless device behaviour or based on a pre-defined rule), determined by wireless device 110A-D, or configured or controlled by network node 115A-C (e.g., the network determines priorities or the new configuration). In a particular embodiment, the adaption of the procedure reduces a number of measurements to be logged.

When adaptation is performed for two or more procedures, the procedures may be adapted sequentially (e.g., adapted in any order (randomly) or in a specific order (e.g., based on a configured order, based on priorities for resource allocation, based on time-criticality of the procedures, based on weights, etc.)), or jointly (e.g., two measurement procedures are adapted such that measurement requirements are still met for both measurements).

At step 508, wireless device 110A-D performs the parallel multicast measurements of the MBMS transmission in accordance with the adapted procedure. The performance of the parallel multicast measurements may include any one or combination of the following measurement procedures:
 configuring a measurement;
 configuring duplex mode (e.g., half duplex or full duplex) to be used during the measurement;
 configuring or selecting resources for the measurement;
 configuring at least one receiver parameter for performing the measurement;
 starting, restarting, stopping, delaying, or resuming the measurement;
 receiving a radio signal;
 sampling on a radio signal;
 combining two or more measurement samples;
 performing a measurement;
 logging a measurement;
 reporting a measurement; and
 configuring activity level of the wireless device 110A-D or its activity state during the measurement.

Performing the adapted procedure in accordance with the multicast measurement capabilities of the wireless device 110A-C may include any one or combination of the following operations:
 signaling of the multicast measurement capabilities to another node (e.g., another wireless device 110A-D, a radio network node 115A-C, a core network node 120 or 130, or an external node);
 performing or adapting one or more wireless device's measurement procedures based on the capabilities (described in more detail in the following section);
 adapting one or more wireless device's multicast measurement procedures based on the capabilities;
 adapting one or more wireless device's non-multicast measurement procedures based on the capabilities;
 adapting one or more wireless device's transmission (e.g., may transmit if cannot perform measurement because of its parallel multicast measurement capabilities);
 adapting one or more wireless device's multicast reception procedure (e.g., receive the MBMS service in the subframes where the measurements are performed); and
 adapting a wireless device's activity state (e.g., aligning wireless device activity state configuration with the times when the wireless device performs parallel multicast measurements).

In certain embodiments, at least one of the plurality of measurements that is performed is performed on a MBSFN RSRP channel, a MBSFN RSRQ channel, or a MCH BLER associated with a MCH.

Figure 6:
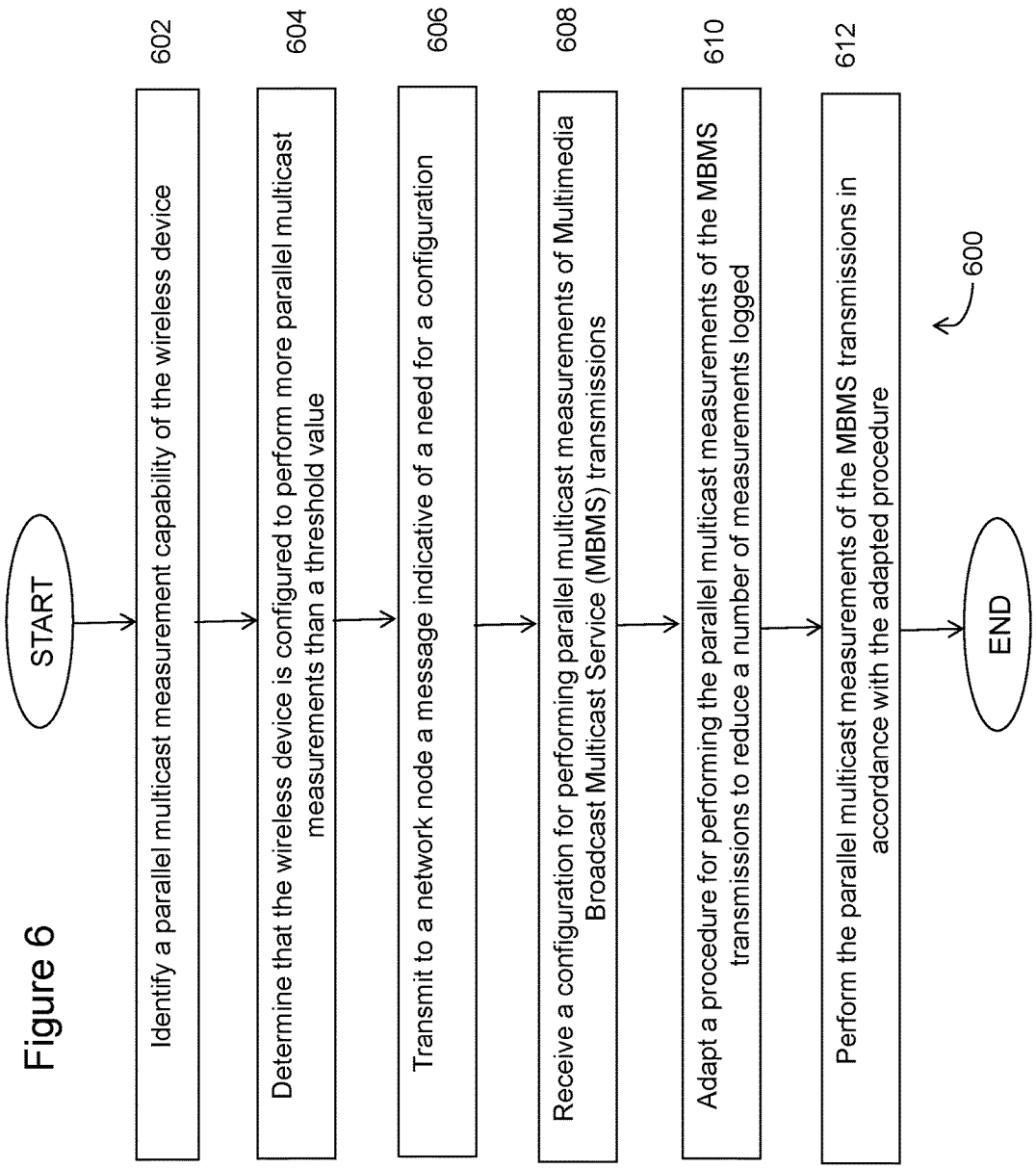
FIG. 6 is as flow chart illustrating another exemplary method for adapting a procedure of a wireless device for performing parallel multicast measurements of MBMS transmissions, according to a particular embodiment.

FIG. 6 is as flow chart illustrating another exemplary method 600 for adapting a procedure of a wireless device 110A-D for performing parallel multicast measurements of MBMS transmissions according to a particular embodiment. The method 600 begins at step 602 with the identification by a wireless device 110A-D of a parallel multicast measurement capability of the wireless device 110A-D. The identification of the parallel multicast measurement capability may be similar to that described above with regard to step 502 of FIG. 5, in certain embodiments.

At step 604, a determination may be made that wireless device 110A-D is configured to perform more parallel multicast measurements than a threshold value. Thus, in certain particular embodiments, the parallel multicast measurement capability identified in step 602 may comprise a threshold value that identifies a maximum number of parallel multicast measurements that may be performed in parallel by the wireless device 110A-D. The number of parallel multicast measurements to be actually performed by the wireless device 110A-D may be compared to and determined to be greater than the threshold value.

In response to determining that to be greater than the threshold value, wireless device 110A-D may transmit, at step 606, a message to network node 115A-C that is indicative of a need for a configuration. In a particular embodiment, for example, the reconfiguration request may include the parallel measurement capability identified in step 620. In other embodiments, the reconfiguration request may include a general request for reconfiguration. Thus, as depicted in FIG. 6, the need for adaptation may be identified by wireless device 110A-C and indicated to another node, such as network node 115A-C. Based on this indication, the network node 115A-C may, for example, provide the new configuration. The indication may also include an indication that the wireless device's parallel multicast measurement capability is exceeded or close to being exceeded. In another example, the indication may comprise a measurement error due to exceeding parallel multicast measurement capability.

At step 608, wireless device 110A-D receives a configuration for performing parallel multicast measurements of MBMS transmissions. The configuration may comprise a new configuration or reconfiguration of a previously defined configuration provided by network node 115A-C.

At step 610, wireless device 110A-D adapts a procedure for performing parallel multicast measurements of MBMS transmissions. In various embodiments, the adaptation of the procedure may include operations similar to those described above with regard to step 506 of FIG. 5. Particular examples of adaptation may include:

- If wireless device 110A-D is configured with more multicast measurements/logs/reports than it is capable of, wireless device 110A-D may select/prioritize/delay/drop some of the configured measurements etc. and perform the measurements within the wireless device's capability. For example, where a total number of parallel multicast measurements to be performed is above a threshold, a subset of the total number of parallel multicast measurements may be identified for logging.
- If a wireless device 110A-D is configured with more measurements/logs/reports than it is capable of, wherein the measurements/logs/reports comprise at least one multicast measurement/log/report, wireless device 110A-D may select/prioritize/delay/drop some of the configured measurements etc. and perform the measurements within the wireless device's capability so that the measurements are meeting one or more pre-defined requirements.
- A wireless device 110A-D may determine to perform a relative multicast measurement which is comparing two absolute measurements, if its parallel multicast measurement capability allows for these two absolute multicast measurements.
- If a wireless device 110A-D is configured with more multicast measurements/logs/reports than it is capable of, the wireless device 110A-D may select/prioritize/delay/drop some of the configured measurements according to one or more pre-defined rules. Examples of such rules include:
  - A wireless device 110A-D may prioritize logging of measurements done on a serving carrier over measurements on a non-serving carrier;
  - A wireless device 110A-D may prioritize logging of measurements done on one or more carriers belonging to a RAT of the serving cell (e.g. measurements such as RSRP/RSRQ on LTE carriers) over measurements on the carriers of a non-serving RAT (e.g. measurements such as CPICH measurements on UTRA carriers);
  - A wireless device 110A-D may prioritize reporting of measurements performed in a connected state over measurements performed in an idle state.

In particular embodiments, prioritizing may include dropping, delaying, performing in a best effort, and/or performing in a certain order such as after the prioritized operation.

At step 612, wireless device 110A-D performs the parallel multicast measurements of MBMS transmissions in accordance with the adapted procedures. In various embodiments, the adaptation of the procedure may include operations similar to those described above with regard to step 606 of FIG. 6.

Figure 7:
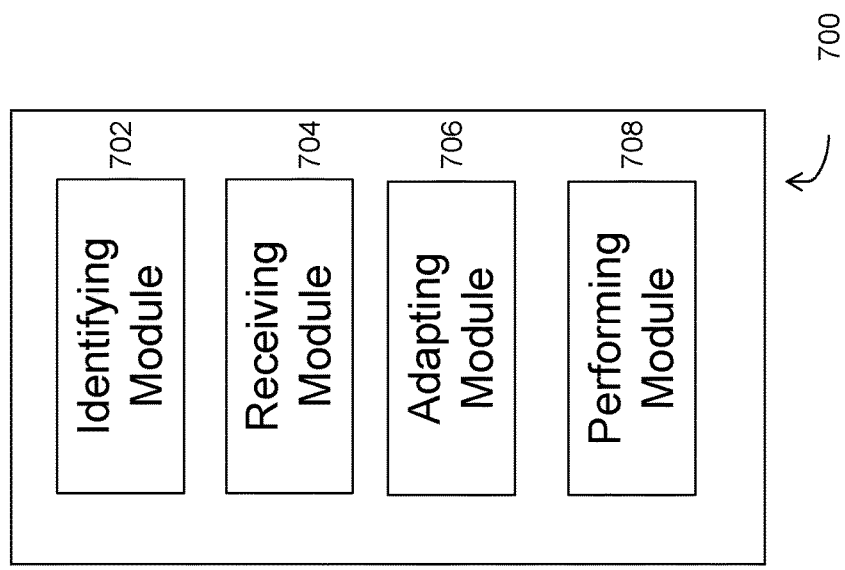
FIG. 7 is a block diagram illustrating a computer networking virtual apparatus, according to a particular embodiment.

FIG. 7 is a block diagram illustrating a computer networking virtual apparatus 700, according to a particular embodiment. As depicted, the virtual apparatus 700 includes at least one identifying module 702, at least one receiving module 704, at least one adapting module 706, and at least one performing module 708.

The identifying module 702 may perform the identifying functions of wireless device 110A-D, as described herein. For example, identifying module 702 may identify a parallel multicast measurement capability of the wireless device 110A-D. The parallel multicast measurement capability may comprise an ability of the wireless device 110A-D for performing parallel multicast measurements of MBMS transmissions. In a particular embodiment, identifying module 702 may identify a maximum number of parallel multicast measurements that may be performed in parallel by wireless device 110A-D, a maximum number of measurements that can be performed by wireless device 110A-D, a maximum number of multicast measurements that can be performed on an associated channel, a maximum number of multicast measurements that can be performed on MBSFN RSRP; a maximum number of multicast measurements that can be performed on MBSFN RSRQ, a maximum number of multicast measurements that can be performed on MCH BLER associated with an MCH, at least one reporting criteria for reporting a plurality of measurements by the wireless device 110A-D, and/or at least one reporting criteria for reporting measurements.

The receiving module 704 may perform the receiving functions of wireless device 110A-D, as described herein. For example, receiving module may receive a configuration for performing parallel multicast measurements of a plurality of MBMS transmissions.

The adapting module 706 may perform the adapting functions of wireless device 110A-D, as described herein. For example, adapting module may adapt a procedure for performing the parallel multicast measurements of the MBMS transmissions based on a configuration received by receiving module 704. In a particular embodiment, for example, the adapting module may be operable to identify a subset of the total number of parallel multicast measurements for logging.

The performing module 708 may perform the performing functions of wireless device 110A-D, as described herein. For example, performing module may perform the parallel multicast measurements of the MBMS transmissions in accordance with the adapted procedure provided by adapting module 706.

Figure 8:
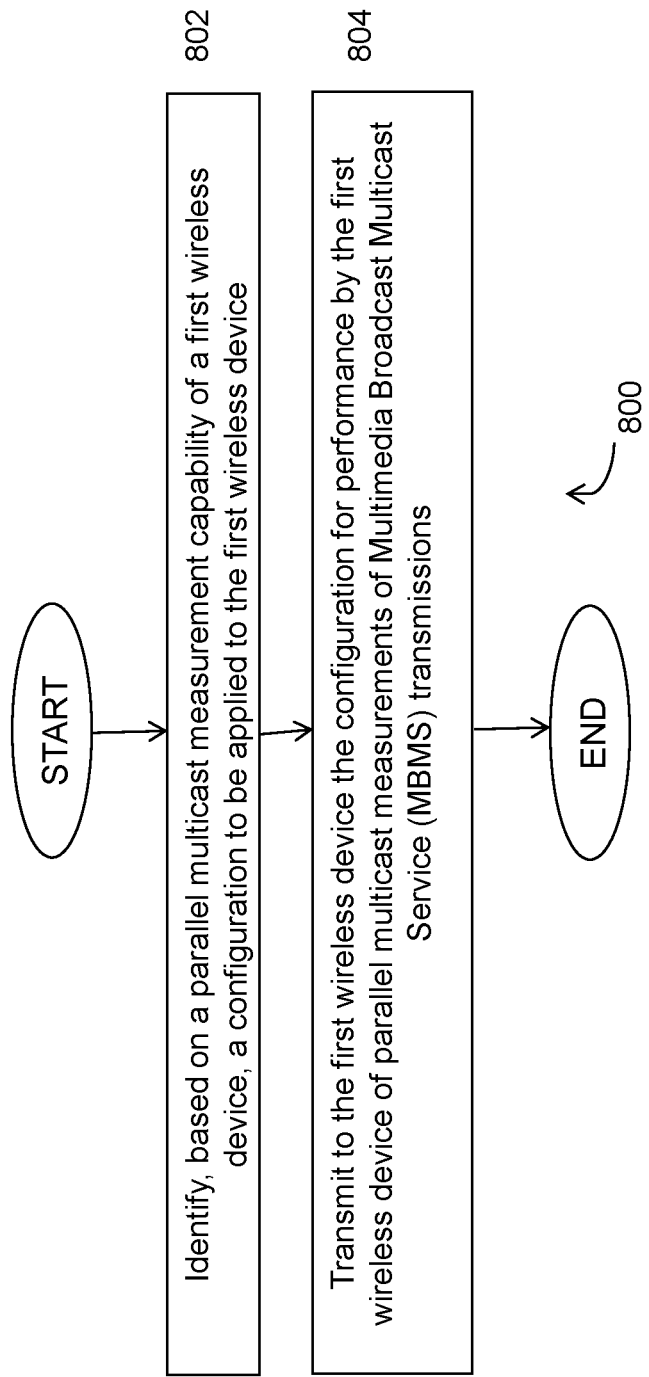
FIG. 8 is as flow chart illustrating another exemplary method for configuring parallel multicast measurements of MBMS transmissions by a network node, according to a particular embodiment.

FIG. 8 is as flow chart illustrating another exemplary method for configuring parallel multicast measurements of MBMS transmissions by a first network node 115A, according to a particular embodiment. The method begins at step 802 with the identification of a configuration to be applied to a first wireless device 110A served by first network node 115A.

In certain embodiments, the identification of the configuration may be based on a parallel multicast capability obtained from first wireless device 110A. In a particular embodiment, for example, obtaining a parallel measurement capability for first wireless device 110A may include one or more of the following operations:

- selecting the relevant pre-defined parallel multicast capability of first wireless device 110A (e.g., from the reporting criteria table),
- obtaining the parallel multicast capability of the first wireless device 110A based on a pre-defined rule, receiving the parallel multicast capability from the first wireless device 110A, receiving the parallel multicast capability of the first wireless device 110A from another network node 115B-C (e.g., from another eNodeB via X2) or a core network node 130 (e.g. MME or positioning node may receive the capability from the eNodeB), and determining based on statistics and/or history of measurement/measurement reports from the first wireless device 110A (e.g., considering that the first wireless device 110A will not report more than it is capable of).

In certain embodiments, the identified configuration may further include using the obtained parallel multicast measurement capability in one or more of the following ways:

signaling of the obtained parallel multicast measurement capability to another node (e.g., another wireless device 110B-D, a radio network node 115B-C, a core network node 130, or an external node), controlling one or more measurement procedures of first wireless device 110A and/or another wireless device 110B-D based on the parallel multicast measurement capability, wherein the measurement procedures may be multicast measurement procedures or non-multicast measurement procedures.

controlling one or more measurement procedures of first wireless device 110A, a second wireless device 110B served by first network node 115A, or another wireless device 110C-D of another network node 115B-C (e.g., when an eNodeB is performing a bidirectional measurement the DL measurement component of which is performed by first wireless device 110A or when the first wireless device 110A and eNodeB are sharing resources in time and/or frequency in a non-static manner) based on the capabilities, wherein the measurement procedures may be multicast measurement procedures or non-multicast measurement procedures;

controlling duplex mode configuration of first wireless device 110A;

controlling transmission configuration and/or resource allocation used for the measurements;

controlling/adapting at least one scheduling parameter or assisting in scheduling of at least one DL or UL unicast/multicast/broadcast transmission (of the network node 115A, of the wireless device 110A, or of another network node 115B-C), based on the obtained parallel multicast measurement capabilities; and collecting statistics on wireless device capabilities and using for O&M, SON, etc.

At step 804, the method continues with the signalling of the configuration for the performance of parallel multicast measurements of MBMS transmissions. For example, in various embodiments, network node 115A-C may signal a new configuration (e.g., the adapted configuration) to at least one of first wireless device 110A served by network node 115A, a second wireless device 110B served by network node 115A, another network node 115B-C, and/or another wireless device 110C-D served by another network node 115B-C.

In various embodiments, signalling of the configuration enables network node 115A to control one or more measurement procedures of first wireless device 110A, based on the parallel multicast measurement capabilities of first wireless device 110A. In particular embodiments, for example, a measurement procedure may include any of the following:

configuring a measurement, configuring duplex mode (e.g., half duplex or full duplex) to be used during the measurement, configuring or selecting resources for the measurement, configuring at least one receiver parameter for performing the measurement, starting, restarting, stopping, delaying, or resuming the measurement, receiving a radio signals, sampling on a radio signal, combining two or more measurement samples, performing a measurement, logging a measurement, reporting a measurement, and configuring activity level of the wireless devices 110A-D or its activity state during the measurement.

Accordingly, in particular embodiments, adaptation of one or more measurement procedures may include:

configuring or reconfiguring one or more measurements, controlling the start, stop, delaying, or resuming of a measurement procedure, controlling the time instances when the measurement sampling is performed, controlling the sampling rate, controlling how the measurement samples are combined, controlling the measurement time, controlling the measurement accuracy, controlling the measurement or measurement sampling periodicity, controlling or changing at least one receiver parameter, controlling measurement logging procedure (e.g., start, stop, restart, etc.), controlling measurement logging configuration (e.g., logging duration, periodicity, amount of logging, time or a trigger or a condition to start/stop/restart/delay/resume the logging), controlling measurement reporting procedure (e.g., start, stop, restart, etc.), controlling measurement reporting configuration (e.g., amount of reporting, periodicity, triggering time/event/condition to start/stop/restart/delay/resume the reporting, reporting duration, etc.), changing the activity level of the wireless device 110A-D (e.g. currently used DRX cycle to a different DRX cycle such as from DRX cycle=640 ms to 40 ms), adapting the number of measurements for the wireless device 110A-D to perform, to log, and/or to report, the measurements comprising at least one multicast measurement, adapting the number of non-multicast measurements for the wireless device 110A-D to perform, to log, and/or to report in parallel to at least one multicast measurement, adapting the number of measurements to log depending on wireless device's CA capability and/or currently used CA configuration (in terms of configured CCs and/or activated SCells). For example, wireless device 110A-D may:

not reduce or reduce the number of measurements to log by certain margin if the wireless device 110A-D is CA capable but is not configured with at least (L−K+n) component carriers (CCs), where L is total number of supported CCs, K is the number of CCs currently configured for CA operation and n is a parameter (e.g. n=1 or 2);

not reduce or reduce the number of measurements configured for logging by certain margin if the wireless device 110A-D is CA capable but is configured with only PCell i.e. single carrier operation, adapting the number of measurements to log depending on its D2D operation capability and/or currently used D2D configuration (in terms of number of D2D signals and/channels the wireless device 110A-D transmit and/or receive). For example:
- the wireless device 110A-D may not reduce at all or reduce the number of measurements configured for logging by certain margin if the wireless device 110A-D is D2D capable but is configured with only cellular (aka WAN operation) operation, controlling the logging of one or more measurements with one or more reduced set of auxiliary information when total number of measurements and/or type of measurements to log is above or about to be above a threshold, such as for example include:
- logging all measurements or certain measurements without positioning or location information,
- logging information with coarse absolute or relative time stamp accuracy when number of measurements to log is above a threshold; whereas logging with fine time stamp accuracy is done when number of measurements to log is below a threshold. Examples of coarse and fine relative time accuracies are ±1.72 second and ±0.72 second respectively of drift in time stamp over a period of 1 hour. A wireless device 110A-D logging with a coarse absolute or relative time stamp accuracy may use a coarse clock (less accurate) that involves less processing; whereas a wireless device 110A-D logging with a fine absolute or relative time stamp accuracy may use a more accurate clock that involves more processing and memory resources.

Configuring or redistributing or rescheduling the logging of measurements in different activity states. This may be triggered based on one or more conditions (e.g., if total number of measurements and/or types of measurements to log in parallel exceed or about to exceed a threshold).
- configure to log: eMBMS measurements in connected state, while non-eMBMS measurements in idle state, or in other way around;
- configure to log: measurements on carriers of serving RAT in connected state, while measurements on carriers of non-serving RAT in idle state;
- adapt or reschedule the logging of measurements based on one or more of wireless device autonomous decision, based on pre-defined rule and based on an indication received from the network node.

As described above with regard to FIGS. 5 and 6, a need for adaptation may be triggered by an indication from a wireless device 110A-D or from another node. The indication may be related to the parallel multicast measurement capability. Based on this indication, the network node 115A-C may, for example, provide a new configuration. The indication may also include an indication that a wireless device's parallel multicast measurement capability is exceeded or close to being exceeded. In another example, the indication may include a measurement error due to exceeding parallel multicast measurement capability.

Particular examples of adaptation effected by the reconfiguration provided by network node 115A may include selecting/prioritizing/delaying/dropping some of the configured measurements etc. and reconfiguring the measurement procedure to be performed such that the measurements to be performed are within the wireless device's capability. The adapted reconfiguration may be performed when the wireless device 110A is or is about to be configured with more measurements/logs/reports than the wireless device 110A is capable of. Additionally or alternatively, the adapted reconfiguration may be provided when the wireless device 110A is or is about to be configured to perform more multicast measurements/logs/reports than the wireless device 110A is capable of.

In particular embodiments, a network node 115A may adapt at least one scheduling parameter or assist another node 115B-C in scheduling the first wireless device 110A and/or at least one second wireless device 110B-D based on parallel multicast measurement capabilities of the first wireless device 110A. For example, if a first wireless device 110A is configured to perform, log and/or report a number of measurements in parallel (e.g., 9 in total) which is larger than a threshold (e.g. 8 in total or 3 eMBMS and 5 non-eMBMS measurements), then a network node 115A may schedule the first wireless device 110A on not more than N (e.g. 6) number of RBs in UL and/or M (e.g. 10) number of RBs in DL in the same subframe. This will enable first wireless device 110A to use its remaining hardware resources (e.g., memory, processor, etc.) for performing/logging/reporting the measurements on this or another carrier.

As another example, if first wireless device 110A is configured to perform, log and/or report a number (e.g., 9 in total) of measurements in parallel which is larger than a threshold (e.g. 8 in total or 3 eMBMS and 5 non-eMBMS measurements), then a network node 115A may deactivate or de-configure one or more SCell(s) if the first wireless device 110A is carrier-aggregation-capable. This may enable first wireless device 110A to use its remaining hardware resources (e.g., memory, processor, etc.) for performing/logging/reporting the measurements on the SCC or another carrier.

Figure 9:
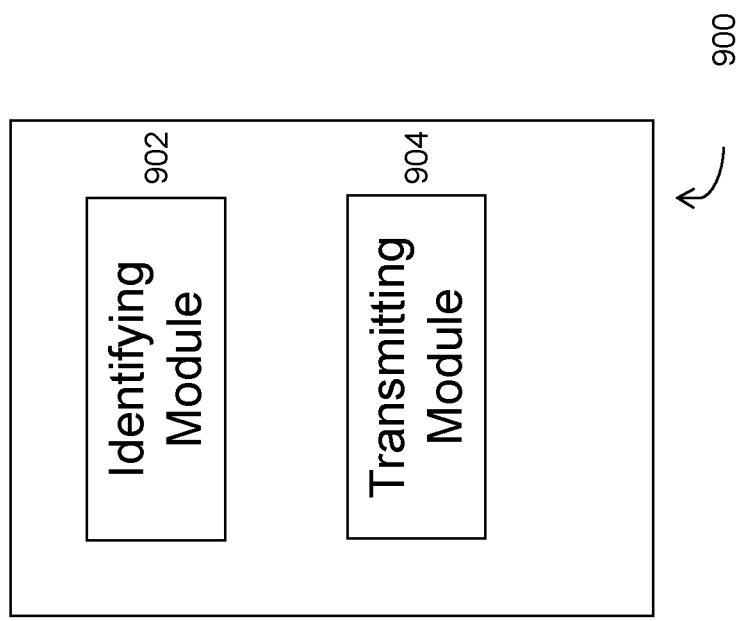
FIG. 9 is a block diagram illustrating a computer networking virtual apparatus, according to a particular embodiment.

FIG. 9 is a block diagram illustrating a computer networking virtual apparatus, according to a particular embodiment. As depicted, the virtual apparatus 900 includes at least one identifying module 902 and at least one transmitting module 904.

The identifying module 902 may perform the identifying functions of network mode 115A-C, as described herein. For example, identifying module 902 may identify, based on a parallel multicast measurement capability of a wireless device 110A-D. In a particular embodiment, the identifying module 902 may determine the parallel multicast measurement capability based on one or more measurement reports received from wireless device 110A-D. Alternatively, identifying module 902 may determine the parallel multicast measurement capability based on a predefined rule.

The transmitting module 904 may perform the transmitting functions of network node 115A-C, as described herein. For example, transmitting module 904 may transmit the configuration to wireless device 110A-D. The configuration may relate to the performance by the wireless device of parallel multicast measurements of MBSM transmissions. For example, the configuration may adapt a previous configuration maintained by the wireless device 110A-D, one or more multicast measurement procedures to be performed by the wireless device 110A-D, one or more non-multicast measurement procedures to be performed by the wireless device 110A-D, one or more transmission procedures of the wireless device 110A-D, one or more multicast reception procedures of the wireless device 110A-D, and/or an activity state of wireless device 110A-D to align the activity state with the activity state when performing parallel multicast measurements. Additionally or alternatively, the configuration may adapt a duplex mode configuration of wireless device 110A-D, a transmission configuration of the first wireless device 110A-D, a resource allocation used for performing parallel multicast measurements by wireless device 110A-D, at least one scheduling parameter associated with the performance of parallel multicast measurements by wireless device 110A-D, and/or a collection of statistics related to the capability of wireless device 110A-D.

Figure 10:
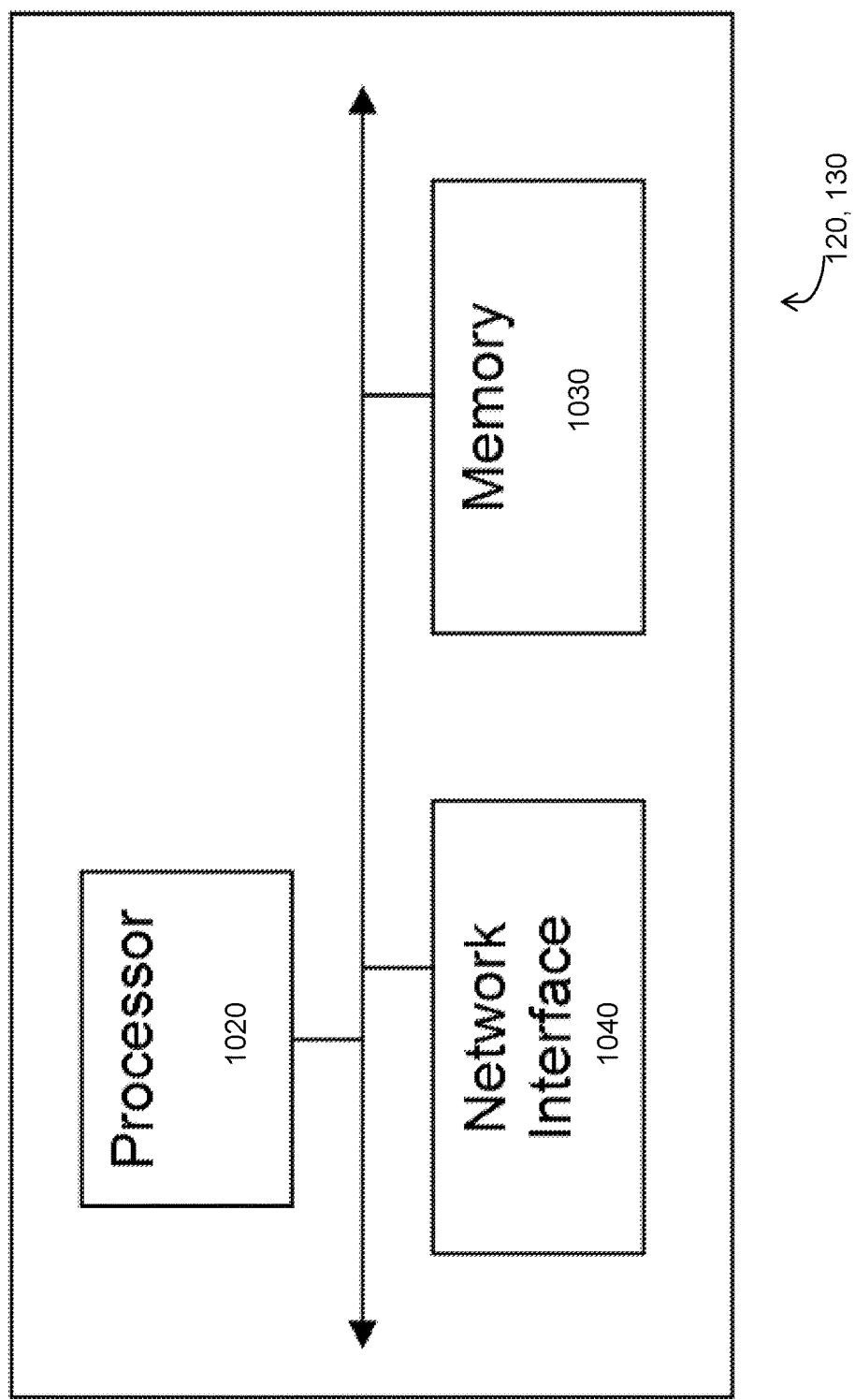
FIG. 10 is a block diagram illustrating an exemplary controller node, according to a particular embodiment.

FIG. 10 is a block diagram illustrating an example embodiment of a core network node 130. Examples of core network node 130 can include a mobile switching center (MSC), a serving GPRS support node (SGSN), a mobility management entity (MME), a radio network controller (RNC), a base station controller (BSC), and so on. Core network node 130 includes processor 1020, memory 1030, and network interface 1040. In some embodiments, processor 1020 executes instructions to provide some or all of the functionality described above as being provided by core network node 130, memory 1030 stores the instructions executed by processor 1020, and network interface 1040 communicates signals to an suitable node, such as a gateway, switch, router, Internet, Public Switched Telephone Network (PSTN), radio network nodes 115, other core network nodes 130, etc.

Processor 1020 includes any suitable combination of hardware and software implemented in one or more modules to execute instructions and manipulate data to perform some or all of the described functions of core network node 130. In some embodiments, processor 1020 includes, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for core network node 130, send output from core network node 130, perform suitable processing of the input or output or both, communicate to other devices, or any combination of the preceding. Network interface 1040 includes appropriate hardware (e.g., port, modem, network interface card, etc.) and software, including protocol conversion and data processing capabilities, to communicate through a network.

Other embodiments of core network node 130 include additional components (beyond those shown in FIG. 10) responsible for providing certain aspects of the core network node's functionality, including any of the functionality described above and/or any additional functionality (including any functionality necessary to support the solution described above).

Certain embodiments may have one or more technical advantages. For example, certain embodiments reconfigure a wireless device to reduce the number of measurements to be logged during the performance of parallel multicast measurements. Specifically, a wireless device may be reconfigured to select, prioritize, delay, or drop some of the configured measurements to be performed. As a result, a wireless device may be configured to log more critical measurements when the number of measurements to be performed exceeds a threshold level.

As another advantage, certain embodiments reconfigure a wireless device to reduce wireless device complexity and power consumption. For example, certain embodiments may reconfigure a wireless device by changing, controlling or altering the sampling rate, a measurement time, sampling periodicity, or receiver parameter. Configuration changes that reduce the number of measurements taken and/or the measurements logged may reduce power consumption. As another example, certain embodiments may change the activity level of a wireless device during the performance of parallel multicast measurements by decreasing the DRX cycle.

As another advantage, certain embodiments reconfigure a wireless device to more efficiently reuse spare resources (e.g., memory, processors, etc.) for logging measurements. For example, certain embodiments may reduce the number of measurements performed and, thus, reduce the processing power required to perform those measurements. Likewise, where fewer measurements are performed, less processing power is required to log the measurements and/or report the measurements. Additionally, less memory is required for storing logged measurements.

As still another advantage, certain embodiments inform other nodes of a particular wireless device's capabilities. For example, certain embodiments result in a first network node transmitting configuration information of a wireless device to a second network node. As a result, both network nodes may adjust the number and or frequency of measurements requested from the wireless device.

Although this disclosure has been described in terms of certain embodiments, alterations and permutations of the embodiments will be apparent to those skilled in the art. For example, although some embodiments have been described with reference to certain radio access technologies, any suitable radio access technology (RAT) or combination of radio access technologies may be used, such as long term evolution (LTE), LTE-Advanced, UMTS, HSPA, GSM, cdma2000, WiMax, WiFi, etc. Likewise, while particular embodiments are described in reference to MBMS transmission in LTE, the embodiments are applicable to any broadcast or multicast service type and any RAT or multi-RAT systems where a UE receives and/or transmits radio signals (e.g., LTE FDD, LTE TDD, WCDMA/HSPA, GSM/GERAN, Wi Fi, WLAN, CDMA2000 etc.)

Particular embodiments may be applicable to single carrier as well as to multicarrier or carrier aggregation (CA) operation of the wireless device in which the wireless device is able to receive and/or transmit data to more than one serving cells. The term carrier aggregation (CA) may be interchangeably referred to as "multi-carrier system," "multi-cell operation," "multi-carrier operation," "multi-carrier" transmission and/or reception. In CA, one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

In some embodiments, the term subframe may refer to any time unit. In some embodiments, the terms MBMS subframe and MBSFN subframe may be used interchangeably. The disclosed embodiments, however, are not limited to MBMS on a subframe level. The disclosed embodiments may apply to any duration or time period over which MBMS (or other radio transmission type for which the embodiments apply) can be transmitted in the current or in future communication system (e.g., frame, time slot, symbols etc.). Furthermore, the disclosed embodiments are not limited to MBMS and they may apply in a similar way to any multicast or broadcast type of transmissions or service.

Modifications, additions, or omissions may be made to the systems and apparatuses disclosed herein without departing from the scope of the disclosure. The components of the systems and apparatuses may be integrated or separated. For example, other network nodes, such as one or more radio network controllers, can be configured between the radio access nodes 115A-C and core network nodes 130 of FIG. 1. Such other network nodes can include processors, memory, and interfaces similar to those described with respect to FIG. 3. Alternatively, such other network nodes may not necessarily include a wireless interface, such as transceiver 310.

Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

The above description of the embodiments does not constrain this disclosure. Other changes, substitutions, and alterations are possible without departing from the spirit and scope of this disclosure.

The invention claimed is:

1. A method by a wireless device for performing parallel multicast measurements, the method comprising:
  identifying, by the wireless device, a parallel multicast measurement capability of the wireless device, the parallel multicast measurement capability comprising a threshold value identifying a maximum number of parallel multicast measurements that are performed in parallel by the wireless device;
  determining, by the wireless device, that the wireless device is configured to perform more parallel multicast measurements than the threshold value;
  transmitting to a network node a message indicative of a need for a configuration;
  receiving, from the network node, the configuration for performing parallel multicast measurements of a plurality of Multimedia Broadcast Multicast Service (MBMS) transmissions;
  based on the configuration received from the network node, adapting a procedure for performing the parallel multicast measurements of the plurality of MBMS transmissions,
    wherein the adapted procedure for performing the parallel multicast measurement of the plurality of MBMS transmissions results comprises:
      determining that a total number of parallel multicast measurement is above a threshold and
      identifying a subset of the total number of parallel multicast measurement for logging,
    wherein the adapted procedure reduces a number of parallel multicast measurements performed or reduces a number of measurement results logged; and
  performing a plurality of parallel multicast measurements of the plurality of MBMS transmissions in accordance with the adapted procedure.

2. A method by a wireless device for performing parallel multicast measurements, the method comprising:
  identifying, by the wireless device, a parallel multicast measurement capability of the wireless device;
  receiving, from a network node, a configuration for performing parallel multicast measurements of a plurality of Multimedia Broadcast Multicast Service (MBMS) transmissions;
  based on the configuration received from the network node, adapting a procedure for performing the parallel multicast measurements of the plurality of MBMS transmissions,
    wherein the adapted procedure for performing the parallel multicast measurement of the plurality of MBMS transmissions results comprises:
      determining that a total number of parallel multicast measurement is above a threshold and
      identifying a subset of the total number of parallel multicast measurement for logging; and
  performing a plurality of parallel multicast measurements of the plurality of MBMS transmissions in accordance with the adapted procedure.

3. The method of claim 2, wherein identifying the parallel multicast measurement capability comprises retrieving the parallel multicast measurement capability from a memory of the wireless device.

4. The method of claim 2, wherein at least one of the plurality of parallel multicast measurements are performed on a channel is selected from a group consisting of:
  Multimedia Broadcast Multicast Service Reference Signal Received Power (MBSFN RSRP);
  Multimedia Broadcast Multicast Service Reference Signal Received Quality (MBSFN RSRQ); and
  Multicast Channel Block Error Rate (MCH BLER) associated with a Multicast Channel (MCH).

5. The method of claim 2, further comprising signalling the parallel multicast measurement capability to the network node to request the configuration for performing the parallel multicast measurements.

6. The method of claim 2, wherein the procedure for performing the parallel multicast measurements of the plurality of MBMS transmissions comprises at least one of:
  configuring a measurement;
  configuring the wireless device for half duplex mode or full duplex mode;
  configuring or selecting resources for measurement;
  configuring at least one receiver parameter for performing the parallel multicast measurements;
  starting, restarting, stopping, delaying, or resuming the parallel multicast measurements; receiving a radio signal;
  sampling on a radio signal;
  combining two or more measurement samples obtained from the performance of the plurality of parallel multicast measurements;
  performing a measurement;
  logging a measurement;
  reporting a measurement; and configuring an activity level of the wireless device or an activity state of the wireless device during the performance of the parallel multicast measurements.

7. The method of claim 2, wherein identifying the parallel multicast measurement capability comprises determining at least one of a parameter selected from a group consisting of:
   a maximum number of measurements that are performed by the wireless device;
   a maximum number of multicast measurements that can be performed by the wireless device;
   a maximum number of multicast measurements that can be performed on an associated channel;
   a maximum number of multicast measurements that can be performed on MBSFN RSRP a maximum number of multicast measurements that can be performed on MBSFN RSRQ;
   a maximum number of multicast measurements that can be performed on MCH BLER associated with an MCH;
   at least on reporting criteria for reporting a plurality of measurements by the wireless device, wherein at least one of the plurality of measurements comprises a multicast measurement; and
   at least one reporting criteria for reporting a plurality of measurements.

8. The method of claim 2, wherein identifying the parallel multicast measurement capability comprises identifying a maximum number of measurements that are performed by the wireless device, the maximum number of measurements comprises of at least one unicast measurement and at least one multicast measurement.

9. The method of claim 2, wherein adapting the procedure for performing the parallel multicast measurements of the plurality of MBMS transmissions comprises at least one of:
   adapting one or more multicast measurement procedures to be performed by the wireless device;
   adapting one or more non-multicast measurement procedures to be performed by the wireless device;
   adapting one or more transmission procedures;
   adapting one or more multicast reception procedures;
   adapting an activity state of the wireless device to align the activity state with the activity state when performing parallel multicast measurements.

10. The method of claim 2, wherein adapting the procedure for performing the parallel multicast measurements of the plurality of MBMS transmissions comprises at least one of:
   configuring or reconfiguring one or more of the plurality of parallel multicast measurements;
   controlling a start, stop, delay, or resume of one or more of the plurality of parallel multicast measurements;
   adjusting a timing of when measurement sampling is performed during the performance of the plurality of parallel multicast measurements;
   adjusting a sampling rate for the performance of the plurality of parallel multicast measurements;
   adjusting how a plurality of measurement samples are combined;
   adjusting a measurement time;
   adjusting a level of measurement accuracy;
   adjusting a measurement periodicity;
   adjusting a reporting frequency;
   adjusting at least one receiver parameter;
   adjusting a measurement logging procedure; and
   adjusting a number of the plurality of parallel multicast measurements logged.

11. A method by a first network node for configuring a first wireless device to perform parallel multicast measurements, the method comprising:
   identifying, based on a parallel multicast measurement capability of the first wireless device, a first configuration to be applied to the first wireless device,
      wherein the first configuration comprises a new configuration or a previous configuration; and
   transmitting, to the first wireless device, the first configuration for performing by the first wireless device a plurality of parallel multicast measurements associated with one of a plurality of Multimedia Broadcast Multicast Service (MBMS) transmissions, the first configuration adapting the previous configuration maintained by the first wireless device,
   wherein the parallel multicast measurement capability is determined based on one or more measurement reports received from the first wireless device,
      wherein the adapted procedure for performing the parallel multicast measurement of the plurality of MBMS transmissions results comprises:
         determining that a total number of parallel multicast measurement is above a threshold and
         identifying a subset of the total number of parallel multicast measurement for logging.

12. The method of claim 11, further comprising receiving an indication of the parallel multicast measurement capability from the first wireless device, configuration information is provided in response to the indication from the first wireless device.

13. The method of claim 11, wherein the parallel multicast measurement capability is predefined, determined based on a predefined rule, or received from the first wireless device.

14. The method of claim 11, wherein the new configuration and the previous configuration relate to at least one of:
   one or more multicast measurement procedures to be performed by the first wireless device;
   one or more multicast measurement procedures to be performed by a second user equipment served by the first network node.

15. The method of claim 11, wherein the parallel multicast measurement capability is selected from a group consisting of:
   a maximum number of measurements that are performed by the first wireless device;
   a maximum number of multicast measurements that can be performed by the first wireless device;
   a maximum number of multicast measurements that can be performed on an associated channel;
   a maximum number of multicast measurements that can be performed on MBSFN RSRP a maximum number of multicast measurements that can be performed on MBSFN RSRQ;
   a maximum number of multicast measurements that can be performed on MCH BLER associated with an MCH;
   at least on reporting criteria for reporting a plurality of measurements by the first wireless device, wherein at least one of the plurality of measurements comprises a multicast measurement; and
   at least one reporting criteria for reporting a plurality of measurements.

16. The method of claim 11, wherein the parallel multicast measurement capability comprises a maximum number of measurements that are performed by the first wireless device, the maximum number of measurements comprising at least one unicast measurement and at least one multicast measurement.

17. The method of claim 11, wherein the first configuration adapts at least one of:
- one or more multicast measurement procedures to be performed by a second wireless device served by a second network node;
- one or more non-multicast measurement procedures to be performed by the first wireless device;
- one or more transmission procedures of the first wireless device; one or more multicast reception procedures of the first wireless device; and
- an activity state of the first wireless device to align the activity state with the activity state when performing parallel multicast measurements.

18. The method of claim 11, wherein the first configuration adapts at least one of:
- a duplex mode configuration of the first wireless device;
- a transmission configuration of the first wireless device;
- a resource allocation used for performing the plurality of parallel multicast measurements by the first wireless device;
- at least one scheduling parameter associated with the performance of the plurality of parallel multicast measurements by the first wireless device; and
- a collection of statistics related to the capability of the first wireless device.

* * * * *